May 18, 1937. L. R. RUNALDUE 2,081,044
THERMOELECTRIC MEASURING INSTRUMENT
Filed July 16, 1935
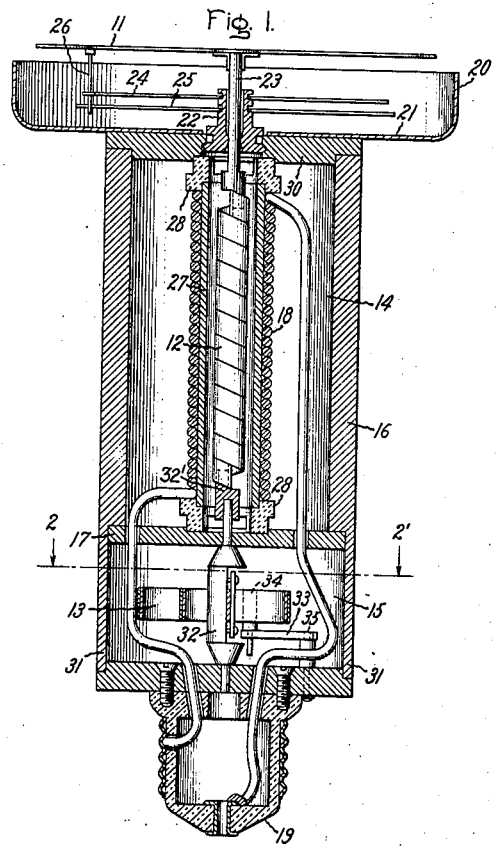
Fig. 1.
Fig. 3.
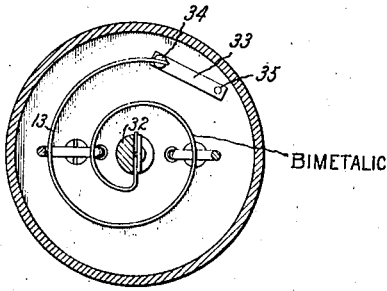
Fig. 2.
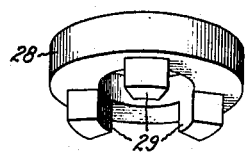
Fig. 4.
Inventor:
Lewis R. Runaldue,
by Harry E. Dunham
His Attorney.

Patented May 18, 1937

2,081,044

UNITED STATES PATENT OFFICE 2,081,044

THERMOELECTRIC MEASURING INSTRUMENT

Lewis R. Runaldue, Pittsfield, Mass., assignor to General Electric Company, a corporation of New York Application July 16, 1935, Serial No. 31,744

6 Claims. (Cl. 171—271)

My invention relates to electroresponsive instruments and concerns particularly instruments of the thermal type compensated for variations in ambient temperature.

It is an object of my invention to provide relatively simple, inexpensive devices for measuring maximum and minimum values of electrical quantities which will be unaffected by momentary variations in the measured quantity, for example, by impulse voltages and currents, and which will also be unaffected by sudden variations in ambient temperature.

It is an object to provide compact, rugged instruments adapted to be inserted in ordinary light sockets throughout an electrical system to permit making voltage surveys on the system.

Other and further objects and advantages will become apparent as the description proceeds.

In carrying out my invention in its preferred form, I provide a pair of oppositely acting bimetallic deflecting elements for operating an indicating pointer. The two elements are in different compartments of a casing of thermally conducting material and one of them is surrounded by a heating coil connected to the circuit to be measured, the other element being affected only by atmospheric temperature. The design is such that both elements respond with substantially equal time lag to variations in ambient temperature.

The features of my invention which are believed to be novel and patentable will be pointed out in the claims appended hereto. A better understanding of my invention may be obtained by referring to the following description taken in connection with the accompanying drawing in which Fig. 1 is an elevation partly in cross section of a device constructed in accordance with my invention; Fig. 2 is a view of a cross section of the apparatus of Fig. 1 cut by the plane 2—2'; Fig. 3 is an indicator end view of the apparatus; and Fig. 4 is a perspective view of one of the thermally insulating washers used in the apparatus of Fig. 1.

Referring now more in detail to the drawing in which like reference characters are used to designate like parts throughout, I have illustrated my invention by means of a maximum and minimum voltmeter having a pointer 11 connected to a bimetallic helix 12 which is connected, in turn, to an oppositely acting bimetallic spiral 13. The bimetallic elements 12 and 13 are mounted in separate compartments 14 and 15 of a cylindrical casing 16 having a partition 17. The casing 16 is made up of material, such as aluminum, which is a good conductor of heat and serves to keep all parts of the surface of the casing 16 at substantially the same temperature. The bimetallic helix 12 is surrounded by a heating coil 18 of wire composed of a material having a relatively low temperature coefficient of resistance. The coil 18 is connected to the circuit to be measured and it will be understood that the relationship between the length and thickness of the wire forming the coil 18 is made such as to obtain a suitable resistance according to whether the device is to be used as a voltmeter or ammeter.

When the device takes the form of a voltmeter, the plug 19, having contacts connected to the coil 18, and conforming to the type usual on electric lamp bases, may be mounted upon the lower end of the casing 16 to permit inserting the device in electric light sockets for measuring actual voltage at the socket.

A cupped scale plate 20 may be mounted on the other end of the casing 16 to protect the pointers and to provide a protected surface 21 on which a scale may be marked. A bushing 22 is secured in an opening in the casing 16 and a heat insulating fibre shaft 23, extending through the bushing 22, is provided to connect the upper end of the bimetallic helix 12 to the pointer 11. Maximum and minimum pointers 24 and 25 are mounted on the bushing 22 in a manner to engage it frictionally. A pin 26 depending from the indicating pointer 11 is provided to move the pointers 24 and 25 to maximum and minimum positions reached by the indicating pointer 11.

Preferably, the heating coil 18 is wound on a tube 27 composed of a heat-conducting material like aluminum and coated with a material which is an electrical insulator but which readily conducts heat, for example, aluminum oxide. In order to prevent heat produced by the heating coil 18 from being transferred by direct conduction to the casing 16 or to the compartment 15, thermally insulating washers 28 are provided for supporting the tube 27 in the compartment 14 of the casing 16. The ends of the tube 27 fit into circular grooves in the washers 28 and the washers 28, in turn, are provided with feet 29 fitting into depressions in the partition 17 and the wall 30 at the opposite end of the compartment 14. The use of the feet 29 instead of a solid construction for the washers 28, helps decrease heat conductivity to a minimum. The washers 28, may be composed of any good heat insulator which will stand the temperature to which the heating coil 12 will cause it to rise. Asbestos base plastic material has been found suitable.

The parts of the device are so arranged and proportioned as far as possible that both bimetallic elements 12 and 13 respond with the same time lag to variations in ambient temperature. This may be accomplished by making the lower compartment 15 identical in size and shape with the upper compartment 14 and providing a bimetallic strip and a surrounding tube in the compartment 15, similar to the parts 12 and 27. Both bimetallic strips are then shielded to about the same extent and should respond with about the same time lag to variations in ambient temperature. I find, however, that substantially the same result may be obtained by suitable design without actually making the parts identical in the compartments 14 and 15. Accordingly, to effect a saving in space, I shorten the compartment 15 and utilize a spiral bimetallic strip 13 therein. To obtain the equal time lags when the compartment 15 is shorter, the mass of the bimetallic spring 13 and of the shaft 32 are made such that their thermal capacities make up for the elimination of insulating supporting washers. There are no heat-insulating washers in compartment 15 but the mass to be heated by the ambient temperature of the casing 16 is greater in proportion than in compartment 14 so that the time lag is approximately that of the thermostatic helix 12 and its supports.

A specially formed shaft 32 of light material like aluminum is mounted in the compartment 15 and extends through the partition 17 for attachment through a heat insulating fibre piece 32' to the lower end of the bimetallic helix 12. The inner end of the bimetallic spiral 13 is clamped to the shaft 32 and the outer end is connected to the casing in a manner which will prevent angular motion, but will permit it to wander radially to avoid strains. For this purpose a link 33 may be provided, pivotally attached at 34 to the outer end of the bimetallic spiral 13 and pivotally attached at 35 to the casing 16. If desired, in order to compensate for any slight variations in the resistance of the heating coil 18 which may occur through variation in ambient temperature, I may make the relative lengths of the bimetallic elements 12 and 13 such that one of them produces slightly greater angular motion in response to a given variation in ambient temperature than the other.

Deflection of the bimetallic elements 12 and 13 is produced in the well known manner by virtue of the fact that the two metals of which each element is composed have unequal temperature coefficient of expansion and the elements are, therefore, twisted when variation in temperature takes place. The amount of twist or deflection of each element is, of course, dependent upon its temperature.

When current flows through the heating coil 18, the temperature in the compartment 14 will rise and the temperature of the casing 16 will also be raised. When equilibrium is reached, the bimetallic spiral 13 will indicate by its angular deflection, the temperature of the casing and similarly the bimetallic helix 12 will indicate the temperature of the heating coil 18. As the two bimetallic elements are arranged to deflect oppositely, the deflection of the pointer 11 will indicate the difference in temperature between the heating coil 18 and the casing 16.

The temperature difference is proportional to the product of the energy loss in the coil times the resultant thermal resistance of the washers 28 and the air (or any other thermal insulator one may choose to use) in the compartment 14. The energy loss, however, is proportional to the square of the voltage impressed on the heating coil 18, and the deflection of the pointer 11 is, therefore, an indication of the voltage independent of ambient temperature.

If the bimetallic spiral 13 were placed in the same chamber as the heating coil 18, the bimetallic element 13 would be affected more quickly than the bimetallic helix 12 when the ambient temperature changed suddenly. In such a case, the pointer 11 would indicate a false voltage. To overcome this, the bimetallic spiral 13 is arranged in such a way, as explained above, that the thermal time lags of the bimetallic elements are substantially equal.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. An electroresponsive instrument comprising in combination, a casing of thermally conducting material having a partition dividing said casing into two compartments, in one of said compartments, a tube of thermally conducting material coated with an electrically insulating thermally conducting substance, thermally insulating washers between the ends of said tube and the end walls of the compartment enclosing the tube, supporting said tube in the compartment and insulating it thermally from the walls thereof, a current-conducting heating coil wound upon said tube and adapted to be connected to an electric circuit in which an electrical quantity is to be measured, a bimetallic helix in said tube having two ends relatively movable in response to variations in its temperature, a shaft projecting through one end of said casing and attached at one end to said bimetallic helix, an indicating pointer attached to said shaft, a second shaft mounted in said second compartment, projecting into said first compartment, including a portion composed of thermally insulating material, and attached to the other end of said bimetallic helix, by said thermally insulating material, and a bimetallic spiral acting oppositely to said helix, attached at its inner end to said latter shaft, and connected at the outer end to the enclosing casing, the connection being angularly substantially rigid and radially yieldable.

2. An electroresponsive instrument comprising in combination, a casing of thermally conducting material having a partition dividing said casing into two compartments of unequal lengths, a bimetallic helix in the longer compartment and a bimetallic spiral in the shorter compartment, a shaft projecting through said partition, mechanically connecting one end of said helix to one end of said spiral, a heat insulator being included in said connection, the remaining end of one of said bimetallic elements being connected in a substantially fixed angular position and the other end of the other bimetallic element being free to move to produce an indication, and a current-conducting heating coil in proximity to said bimetallic helix in said longer compartment, and adapted to be electrically connected to a circuit in which an electrical quantity is to be measured, said bimetallic elements being arranged to deflect in opposite directions in response to variations in temperature and produce substantially the same angular deflection in response to variations in ambient temperature, whereby the difference in deflection is dependent upon the difference in temperature between said heating coil and said casing.

3. An electroresponsive instrument comprising in combination a casing of thermally conducting material divided into two compartments, bimetallic deflecting elements in said compartments having substantially equal thermal time lags with respect to variations in the temperature of said casing, a thermally insulating mechanical connection between one end of one bimetallic element and an end of the other bimetallic element, the other end of one of said bimetallic elements being mounted rigidly with respect to angular deflection and the other end of the other bimetallic element being free to deflect to produce indications of the magnitude of a quantity to be measured, and a current-responsive heater in thermal relation with one of said bimetallic elements, said bimetallic elements being arranged to deflect oppositely in response to variations in temperature.

4. An electroresponsive instrument comprising in combination, a casing of thermally conducting material divided into two compartments, a pair of mechanically connected oppositely acting bimetallic deflecting elements in said casing, each in a different compartment and thermally insulated from each other, and a current-responsive heater in thermal relation with one of said bimetallic elements, one end of one of said bimetallic elements being secured in a substantially fixed angular position and the free end of the other element being free to deflect to produce indications of the magnitude of a quantity to be measured.

5. An electroresponsive instrument comprising in combination, a casing of thermally conducting material divided into first and second compartments, first and second bimetallic elements in said compartments, respectively, a heater in thermal relation with one of said bimetallic elements heated in response to the quantity to be measured, a shaft in said first compartment connected to one end of said first bimetallic element, projecting into said second compartment and being connected to said second bimetallic element, and means thermally insulating said second bimetallic element from its containing compartment and from said shaft, said first deflecting element and said shaft together being of greater thermal capacity than said second deflecting element, the excess thermal capacity being such as to counterbalance the retarding effect to heat transfer of said thermal insulation to cause both deflecting elements to vary in temperature with substantially the same time lags in response to variations in ambient temperature, the remaining end of one deflecting element being mounted rigidly with respect to angular deflection, and the remaining end of the other deflecting element being free to deflect to produce indications of the magnitude of the quantity to be measured, said bimetallic elements being arranged to deflect oppositely in response to variations in temperature.

6. An electroresponsive instrument comprising in combination, a casing of thermally conducting material divided into first and second compartments, first and second deflecting elements in said compartments, respectively, comprising bimetallic deflecting strips, a heater in thermal relation with one of said bimetallic strips heated in response to the quantity to be measured, and means thermally insulating said second element from said compartment, said bimetallic strips being arranged to act oppositely in response to variations in ambient temperature, said first deflecting element being of such greater thermal capacity than said second deflecting element as to counterbalance the retardation of transfer of heat between said second deflecting element and said casing by said insulating means and cause both deflecting elements to vary in temperature with substantially equal time lags in response to variations in ambient temperature.

LEWIS R. RUNALDUE.